March 19, 1929. J. G. STEELE 1,706,331
LOCKING LEVER
Filed Jan. 9, 1928
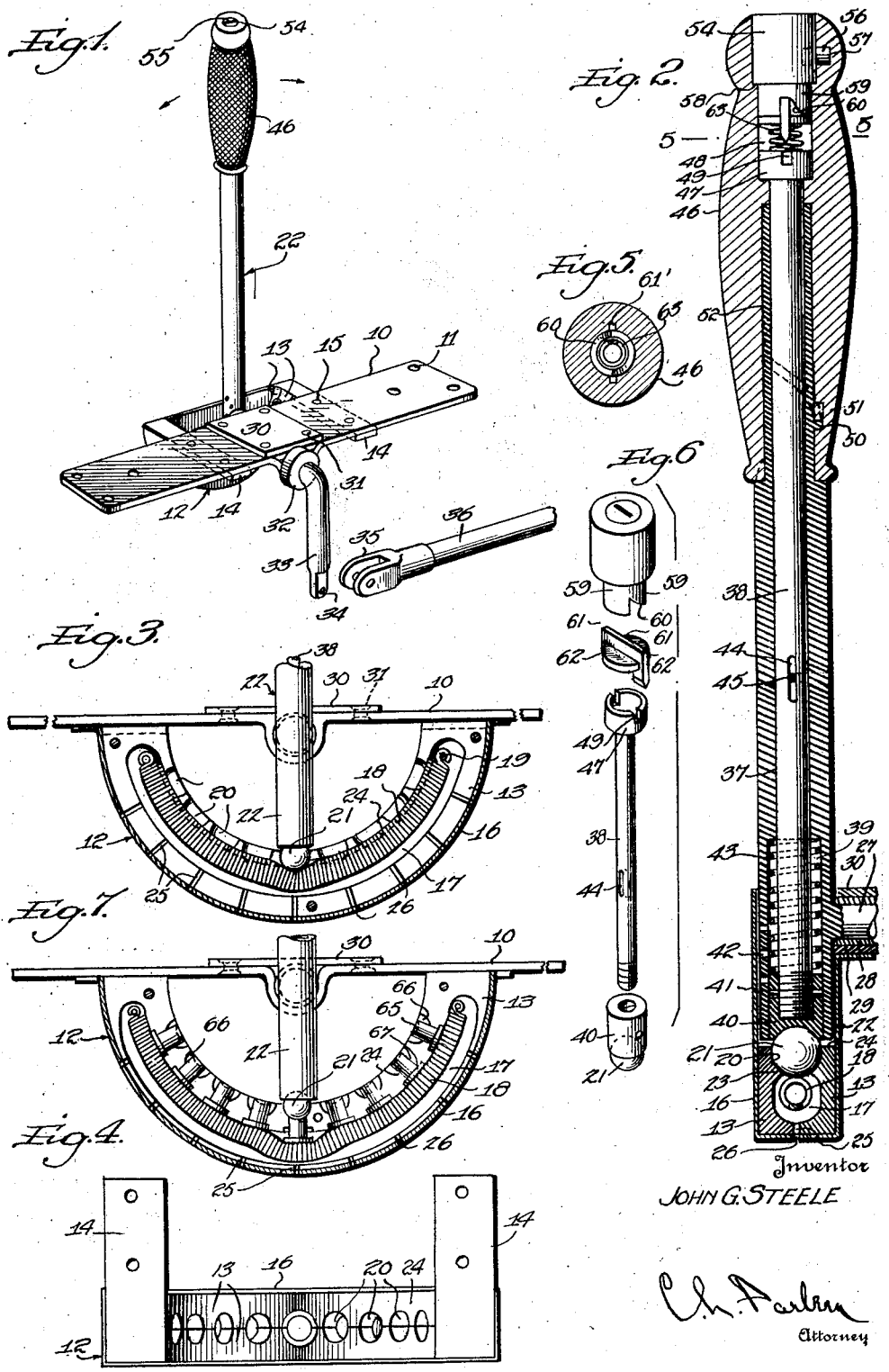
Inventor
JOHN G. STEELE
Attorney Patented Mar. 19, 1929.

1,706,331

UNITED STATES PATENT OFFICE.

JOHN G. STEELE, OF LATROBE, PENNSYLVANIA.

LOCKING LEVER.

Application filed January 9, 1928. Serial No. 245,431.

This invention relates to locking levers and more particularly to a lever adapted for operating the emergency brakes of automobiles.

An important object of the invention is to provide novel means for locking a lever in any one of a number of selected positions.

A further object is to provide a lever which is adapted for a variety of uses, such as means for operating the emergency brakes of automobiles, for operating the throttle valves of steam engines, etc., and provided with novel means for locking the lever in selected positions.

A further object is to provide a novel form of operating lever having advantageous means substituted for the usual pawl and ratchet devices employed for locking levers in selected positions.

A further object is to provide a device of the character described having novel and simple means for locking a lever in selected positions, and which means is adapted readily to be released to permit free movement of the lever in either direction, and to provide key controlled means associated with the locking means for preventing operation of the latter.

A further object is to provide a quadrant associated with a portion of a pivoted lever, a member adapted for engagement between the lever and quadrant for fixing the lever in selected positions, and novel means for releasing the engaging member whereby the lever freely may be swung in either direction.

A further object is to provide a locking member in the form of a ball arranged between the lever and quadrant and adapted normally to be projected toward the latter for engagement within openings formed therein, the ball being movable to a position wherein its center is arranged wholly within the opening to prevent movement of the lever, and to provide means for releasing the ball for movement to a position with its center arranged wholly outwardly of the opening in the quadrant whereby the lever is freely movable in either direction.

A further object is to provide a novel device of the character referred to which is of such construction that its operating parts, when the key controlled means is in operation, cannot be reached to be tampered with by unauthorized persons without breaking the structure, whereby the device is particularly adapted for use as a vehicle locking means.

Other objects and advantages of the invention will be apparent during the course of the following description.

In the drawings, I have shown several embodiments of the invention. In this showing, Figure 1 is a perspective view of the device, Figure 2 is a central longitudinal sectional view through the lever and associated elements, parts being shown in elevation, Figure 3 is a side elevation, with one of the quadrant sections removed, the casing being shown in section, Figure 4 is a plan view of the quadrant and mounting means therefor, Figure 5 is a detail section on line 5—5 of Figure 2, Figure 6 is a perspective view of several of the operating elements arranged in the lever, shown detached and separated, and, Figure 7 is a view similar to Figure 3 showing a slightly modified form of the invention.

Referring to the drawings, the numeral 10 designates a plate having openings 11 therein for the reception of rivets or the like whereby the plate may be secured to any suitable portion of a vehicle such as the frame, or the cross braces extending between the sides thereof. It will become apparent however that the device is not limited in its application to a motor vehicle, but may be employed wherever a locking lever ordinarily is used.

A quadrant indicated as a whole by the numeral 12 is carried by the plate 10. This quadrant comprises a pair of complementary sections 13, one of which is provided at its top portion with laterally projecting arms 14 which may be secured to the plate 10 by rivets or the like 15. The quadrant is preferably substantially semicircular and may be covered at its sides and bottom with a sheet metal casing 16.

The quadrant comprising the sections 13 is provided with an arcuate channel 17 for the reception of a coil spring 18 which extends throughout the greater portion of the length of the channel 17 and is secured at its ends therein by rivets or the like 19 passing through eyes formed at the ends of the spring and through the quadrant sections. This spring is maintained at all times under a slight tension, for a purpose to be described, and lies against the top of the channel 17.

The quadrant is provided in its top with a plurality of openings 20 for the selective reception of a preferably steel ball 21 associated with a lever indicated as a whole by the numeral 22. This lever will be referred to in detail later. The openings 20 communicate with the channel 17, the communication being restricted by inwardly extending shoulders 23 which limit the downward movement of the ball 20. For a purpose to be described, the center of the ball 21 is arranged beneath the top face 24 of the quadrant when the ball engages the shoulder 23. As previously stated, the spring 18 lies against the top of the channel 17, and since a portion of the ball projects into this channel, the ball is movable to its lower limit only against the tension of the spring 18. For the purpose of providing drainage, the bottom of the quadrant is provided at spaced intervals with openings 25 communicating with the channel 17, the casing 16 also being provided with similar openings 26. It will be apparent that any water which may gather in the channel 17 will be drained therefrom through the openings 25 and 26.

The lever 22, as shown in Figures 1 and 2, is provided with a laterally extending shaft portion 27 journaled in a bushing 28 arranged in a depression 29 formed in the plate 10. This depression is covered, and the bushing 28 is retained in position by a small plate 30 riveted to the plate 10 as at 31, or otherwise secured thereto. The outer end of the shaft portion of the lever is provided with a collar 32, which engages the end of the bushing 29, the vertical portion of the lever engaging the opposite portion of the bushing whereby it will be apparent that lateral movement of the lever is prevented. In its present embodiment the invention is illustrated as forming operating means for the emergency brake of a motor vehicle. For this purpose, the inner end of the shaft portion of the lever is provided with a depending arm 33 having an opening 34 in its lower end whereby it may be pivotally connected to the yoke 35 of the emergency brake operating rod 36. It will be apparent that the upper end of the lever is movable to swing the arm 33 and thus apply or release the emergency brake.

The vertical portion of the lever 22 is tubular, thus being provided with an axial opening 37 slidably receiving a vertically reciprocable operating rod 38. This rod extends into an enlarged axial recess 39 formed in the lower end of the lever, and is threaded to a plunger 40 at its lower end. A pin 41 passes through the plunger and through the rod to positively secure these elements together, the outer ends of the pin being flush with the outer face of the plunger 40. The lower end of the lever is provided with a plurality of openings 42 for a purpose to be described. A coil spring 43 is arranged in the recess 39, the upper end of the spring contacting with the upper end of the recess, while the lower end of the spring contacts with the upper end of the plunger 40 to normally project the latter downwardly. The tension of the spring 43 is considerably greater than that of the spring 18 whereby the plunger 40 is adapted to press the ball 21 downwardly to the lower limit of its movement in either of the openings 20. Intermediate its ends, the rod 38 is provided with a slot 44 slidably receiving a pin 45 extending through the lever at right angles to the pin 41. The outer ends of the pin 40 are riveted and polished off flush with the surfaces of the lever.

Means is provided for elevating the rod 38 against the tension of the spring 43 to permit the coil spring 18 to unseat the ball from any of the openings 20 to lift the center of the ball to a position above the upper face of the quadrant. A handle 46 is arranged above the upper end of the lever and forms substantially a continuation thereof. The rod 38 extends through the handle 46 axially thereof and is provided at its upper end with a head 47 arranged in a recess 48 formed in the upper end of the handle, the head seating on the shoulder formed at the lower end of the recess. The head 47 is provided with a transverse slot 49 for a purpose to be described. The body of the lever is provided with a spiral projection 50 engaging in a spiral groove 51 formed in the interior of the handle 46, the projection 50 being carried by an axial extension 52 formed on the lever and extending upwardly into the handle, as shown in Figure 2.

A key controlled lock 54 is arranged in the upper end of the handle and is provided with a key receiving slot 55. A spring pressed pin 56 is carried by the lock 54 and is adapted to engage in an opening 57 to retain the lock in position. The lower end of the lock housing is supported upon a shoulder 58, and a rotatable cylinder 59 is carried by the lock and depends therefrom. This cylinder is provided in opposite sides with cams 60 adapted to engage a transverse locking plate 61, as shown in Figures 2 and 6. The plate 61 is carried by a disk 62 which is normally urged upwardly by a spring 63, the lower end of which contacts with the head 47. Rotation of the locking member 61 is prevented by engagement of the edges thereof in grooves 61' formed in the recess 48.

The form of the device shown in Figure 7 is substantially the same as that previously described except that the ball 21 does not directly engage the spring 18. In the modified construction, reciprocating pins 65 are arranged in openings formed in the quadrant, and the pins are provided at their lower ends with heads 67 to limit their upward movement. The spring 18 engages the head 67 to maintain the pins 65 in normal position.

The operation of the device is as follows:

In assembling the lever, the pin 41 is inserted in position through one of the openings 42, the spring 43 previously having been placed in position. The rod 38 is then turned through a quarter circle to permit the insertion of the pin 45 through the lever and through the slot 44, and the ends of the pin 45 are riveted and polished off flush with the surfaces of the lever. When the lever is nickel plated or otherwise finished, it is extremely difficult to locate the position of the pin 45 to permit the pin to be removed. In order to disassemble the elements referred to, it is necessary to remove the pin 45 and turn the rod 38 through a quarter circle to permit the removal of the pin 41 through one of the openings 42. Thus it will be apparent that tampering with the device with the intention of dislodging the parts thereof is rendered extremely difficult. The plates 10 and 30 preferably are formed of steel and are riveted to each other and to the desired part of the vehicle by hard rivets, thus rendering extremely difficult the removal of the device from the frame, or the removal of the plate 30 to permit the lever to be lifted. To assemble the lock, the spring 63 and the locking member are placed in position, whereupon the pin 56 is depressed into the lock to permit the latter to be inserted in the upper end of the handle. As soon as the pin 56 reaches a point in registration with the opening 57, it will spring thereinto and cannot subsequently be removed.

By turning the handle 46 about its axis a slight distance in one direction, the engagement of the projection 50 and groove 51 will cause the handle to move upwardly with respect to the lever. Since the head 47 seats on the shoulder at the bottom of the recess 48, it will be apparent that the turning of the handle also will lift the rod 38 against the tension of the spring 43. The quadrant spring 18 then will lift the ball 21 to a position wherein its center is arranged above the upper face of the quadrant, whereupon the lever may be swung in either direction as may be desired. The position of the ball, as just described, permits it to pass over the top of the quadrant, moving past the successive openings 20. As soon as the desired position of the lever is reached, the handle 46 is released and the spring 43 will move the plunger 40 downwardly to project the ball 21 to its limit of movement in one of the openings 20. When in such position, the center of the ball will be arranged wholly within the opening in which the ball is arranged. In other words, the center of the ball will be arranged beneath the top face 24 of the quadrant, and the lever will be locked against movement in either direction. With the ball in the position stated, there is no tendency for the sides of the opening 20 in which the ball is arranged to act as a cam to lift the ball and plunger 40 against the tension of the spring 43. It has been found that with the structure disclosed, the vibration and jarring of the vehicle will not cause the ball to become dislodged from any given opening in the quadrant and the lever will be positively maintained in any selected position. The pin 45 prevents rotation of the rod 38 while the engagement of the ends of the locking member 61 in the grooves 61' will prevent rotation of the locking member, and thus the latter will be retained in alinement with the transverse slot 49, the parts being so designed that the elements referred to will be alined when the handle is in its lowermost position. When it is desired to lock the rod 38 against movement, the proper key is inserted in the slot 55 to rotate the cylinder 59, whereupon the cams 60 engage the locking member to move the lower end thereof into engagemnt with the slot 49. This action prevents rotation of the handle 46 and accordingly the projection 50 and groove 51 cannot function to lift the rod 38. The rod readily may be released for movement by rotating the cylinder 59 in the opposite direction, whereupon the spring 63 will project the locking member upwardly to inoperative position. Thus it will be apparent that the device is readily adapted for use as means for fixing the emergency brake lever of a vehicle in any desired position, and as means for preventing the unauthorized movement of the lever. Obviously therefore the brake may be retained in operative position to prevent unauthorized use of the vehicle.

The operation of the form of the device shown in Figure 7 is substantially the same as that previously described and need not be referred to in detail. Instead of the ball directly engaging the spring 18, it will depress either of the pins 65 against the tension of the spring 18, and the ball, when in operative position, will be arranged with its center beneath the inner face of the quadrant to lock the lever against movement. Similarly, when the lever is to be moved, the spring 18, acting on the previously depressed pin 65 will lift the ball to a position with its center above the top of the quadrant, whereupon the lever will be freely movable.

It is to be understood that the forms of my invention herewith shown and described are to be taken as preferred examples of the same and that various changes in the shapes, sizes, and arrangement of parts may be resorted to without departing from the spirit of the invention or the scope of the subjoined claims.

I claim:

1. A device of the character described comprising a pivoted lever, a stationary member arranged adjacent said lever, a locking member movable with said lever, said stationary member being provided with openings to selectively receive said locking member, means carried by said stationary member for normally urging said locking member out of said openings, means carried by said lever for normally overcoming said first named means and seating said locking member in either of said openings, and means for rendering said last named means inoperative.

2. A device of the character described comprising a pivoted lever, a quadrant arranged adjacent said lever, a locking member movable with said lever, said quadrant being provided with openings to receive said locking member, means carried by said quadrant for normally urging said locking member out of said openings, means carried by said lever for normally overcoming said first named means and seating said locking member in either of said openings, and means for rendering said last named means inoperative.

3. A device of the character described comprising a pivoted lever, a quadrant arranged adjacent said lever, a locking member movable with said lever, said quadrant being provided with openings to receive said locking member, spring means carried by said quadrant for normally urging said locking member out of said openings, spring means carried by said lever for normally overcoming said first named spring means and seating said locking member in either of said openings, and means for rendering said last named spring means inoperative.

4. A device of the character described comprising a pivoted lever, a quadrant arranged adjacent said lever, a locking member movable with said lever, said quadrant being provided with openings to receive said locking member, spring means carried by said quadrant for normally urging said locking member partially out of said openings to permit it to pass thereover, spring means carried by said lever for normally overcoming said first named spring means and seating said locking member in either of said openings, and means independent of said locking member for relieving the latter of the tension of said last named spring means to render the latter inoperative.

5. A device constructed in accordance with claim 4 wherein said last named means comprises a plunger normally projected against said locking member by said second named spring means, and means for moving said plunger to release it from said locking member.

6. A device constructed in accordance with claim 4 wherein said last named means comprises a plunger normally engaging said locking member and projected thereagainst by said second named spring means, a rod connected to said plunger, and means for actuating said rod to release said plunger from said locking member.

7. A device constructed in accordance with claim 4 wherein said last named means comprises a plunger normally engaging said locking member and projected thereagainst by said second named spring means, a rod connected to said plunger, and a handle carried by said lever and connected to said rod, said handle being operative to release said plunger from said locking member.

8. A device of the character described comprising a pivoted lever, a quadrant arranged adjacent said lever and provided with an arcuate concentric channel, a locking member movable with said lever, said quadrant being provided with openings communicating with said channel and adapted to receive said locking member, spring means carried by said quadrant within said channel for normally urging said locking member partially out of said openings to permit it to pass thereover, spring means carried by said lever for normally overcoming said first named spring means and seating said locking member in either of said openings with a portion thereof extending into said channel against the tension of said first named spring means, and means for rendering said last named spring means inoperative.

9. A device of the character described comprising a pivoted lever, a quadrant arranged adjacent said lever and provided with an arcuate concentric channel, a locking ball movable with said lever, said quadrant being provided in one face thereof with a plurality of openings communicating with said channel and adapted to receive said ball, a spring arranged in said channel and normally engaging the ball arranged in one of said openings to urge the ball to a point with its center arranged outwardly of the face of said quadrant, a spring carried by said lever and normally urging said ball to a point in one of said openings wherein the center of the ball is arranged inwardly of the face of said quadrant, and means for rendering said last named spring inoperative.

10. A device constructed in accordance with claim 9 wherein said last named means comprises a plunger normally projected against said ball by said second named spring, and means for moving said plunger to release the tension of said second named spring from said ball.

11. A device constructed in accordance with claim 9 wherein said last named means comprises a plunger normally engaging said ball and projected thereagainst by said second named spring, a rod mounted in said lever and connected to said plunger, and a handle carried by said lever and connected to said plunger, said handle being operative to release said plunger from said ball.

12. A device of the character described comprising a pivoted lever, a quadrant arranged adjacent said lever and provided with an arcuate concentric channel, a locking ball movable with said lever, said quadrant being provided in one face thereof with a plurality of openings communicating with said channel and adapted to selectively receive said ball, spring means arranged in said channel and normally engaging the ball arranged in one of said openings to urge the ball to a point wherein its center is arranged outwardly of the face of said quadrant, a plunger mounted in said lever and engaging the said ball, a spring mounted in said lever and engaging said plunger to normally urge the ball to a point in one of said openings wherein the center of the ball is arranged inwardly of the face of said quadrant, a rod arranged in said lever and connected at one end to said plunger, a rotatable handle arranged coaxially with said lever and into which said rod extends, and means operative upon rotation of said handle for moving said rod longitudinally against the tension of the spring in said lever.

13. A device constructed in accordance with claim 12 wherein said last named means comprises a spiral rib carried by said lever, said handle being provided with a coacting spiral groove receiving said rib.

14. A device constructed in accordance with claim 12 provided with means for locking said handle against rotation.

15. A device constructed in accordance with claim 12 wherein said last named means comprises a spiral rib carried by said lever, said handle being provided with a coacting spiral groove receiving said rib, and key controlled means carried by said handle and operative to prevent rotation thereof.

In testimony whereof I affix my signature.

JOHN G. STEELE.